United States Patent
Hsu et al.

(10) Patent No.: US 11,245,293 B2
(45) Date of Patent: Feb. 8, 2022

(54) MOTOR STATOR WITH DOVETAIL OR RECTANGULAR MOUNT STRUCTURE AND STATOR TEETH AIRGAP WIDTH RATIO

(71) Applicant: INDUSTRIAL TECHNOLOGY RESEARCH INSTITUTE, Hsinchu (TW)

(72) Inventors: Chia-Hao Hsu, Tainan (TW); Sheng-Tsz Liu, Hsinchu (TW); Yau-Bin Yang, Taipei (TW); Shou-Long Yu, Taoyuan (TW); Lin-Yen Peng, Hsinchu County (TW); Yang-Guang Liu, Hsinchu County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 174 days.

(21) Appl. No.: 16/591,440

(22) Filed: Oct. 2, 2019

(65) Prior Publication Data
US 2021/0050752 A1    Feb. 18, 2021

(30) Foreign Application Priority Data
Aug. 14, 2019 (TW) .................. 108128968

(51) Int. Cl.
 *H02K 1/16* (2006.01)
(52) U.S. Cl.
 CPC ......... *H02K 1/165* (2013.01); *H02K 2213/03* (2013.01)
(58) Field of Classification Search
 CPC ............ H02K 1/165; H02K 1/16; H02K 1/14; H02K 1/148; H02K 2213/03
 USPC .................. 310/216.086, 433, 216.051, 310/216.069–216.088
See application file for complete search history.

(56) References Cited

U.S. PATENT DOCUMENTS

| | | | |
|---|---|---|---|
| 4,912,353 A * | 3/1990 | Kondo | H02K 1/148 310/216.067 |
| 6,051,898 A | 4/2000 | Sakamoto | |
| 7,245,054 B1 | 7/2007 | Walls et al. | |
| 9,246,361 B2 * | 1/2016 | Yang | H02K 1/24 |
| 9,966,804 B2 | 5/2018 | Yu et al. | |

(Continued)

FOREIGN PATENT DOCUMENTS

| | | |
|---|---|---|
| CN | 1469526 A | 1/2004 |
| CN | 1534847 A | 10/2004 |

(Continued)

OTHER PUBLICATIONS

TW Office Action in Application No. 108128968 dated Jun. 29, 2020.

(Continued)

*Primary Examiner* — Maged M Almawri
(74) *Attorney, Agent, or Firm* — Maschoff Brennan (57) ABSTRACT

The disclosure provides a combined motor stator which is configured to be cooperated with a rotor. The combined motor stator includes a stator yoke and a plurality of stator teeth. The stator yoke has a plurality of first mount structures. Each of the plurality of stator teeth has a second mount structure. The second mount structures of the stator teeth are respectively and removably mounted on the first mount structures of the stator yoke. Each of the second mount structures is in a dovetail shape.

9 Claims, 6 Drawing Sheets

(56) References Cited

U.S. PATENT DOCUMENTS

| | | | |
|---|---|---|---|
| 10,243,437 B2 | 3/2019 | Liang et al. | |
| 10,374,536 B2 | 8/2019 | Huang et al. | |
| 2004/0070304 A1* | 4/2004 | Enomoto | H02K 15/022 |
| | | | 310/216.088 |
| 2004/0189137 A1 | 9/2004 | Hashimoto et al. | |
| 2005/0200226 A1* | 9/2005 | Kim | H02K 1/148 |
| | | | 310/216.057 |
| 2011/0037338 A1* | 2/2011 | Leiber | H02K 1/148 |
| | | | 310/215 |
| 2012/0007463 A1* | 1/2012 | Taniguchi | H02K 1/165 |
| | | | 310/216.051 |
| 2012/0007464 A1* | 1/2012 | Saito | H02K 1/30 |
| | | | 310/216.051 |
| 2012/0112600 A1* | 5/2012 | Kondou | H02K 1/16 |
| | | | 310/216.086 |
| 2012/0275942 A1* | 11/2012 | Knapp | H02K 1/165 |
| | | | 417/423.3 |
| 2013/0106214 A1* | 5/2013 | Chang | H02K 3/522 |
| | | | 310/71 |
| 2013/0119816 A1* | 5/2013 | Yang | H02K 1/24 |
| | | | 310/216.007 |
| 2014/0152127 A1* | 6/2014 | Tang | H02K 5/08 |
| | | | 310/43 |
| 2015/0160671 A1 | 6/2015 | Liu et al. | |
| 2015/0326076 A1* | 11/2015 | Kim | H02K 1/24 |
| | | | 310/216.086 |
| 2016/0329794 A1* | 11/2016 | Li | H02K 1/2786 |
| 2017/0163104 A1* | 6/2017 | Li | H02K 3/18 |
| 2018/0131245 A1* | 5/2018 | Hsu | H02K 1/16 |
| 2018/0159393 A1 | 6/2018 | Yu et al. | |

FOREIGN PATENT DOCUMENTS

| | | |
|---|---|---|
| CN | 101951041 A | 1/2011 |
| CN | 102005882 A | 4/2011 |
| CN | 102427282 A | 4/2012 |
| CN | 204156618 U | 2/2015 |
| CN | 204179770 U | 2/2015 |
| CN | 204258450 U | 4/2015 |
| CN | 205195443 U | 4/2016 |
| CN | 106849424 A | 6/2017 |
| CN | 108718121 A | 10/2018 |
| CN | 109565231 A | 4/2019 |
| CN | 109643915 A | 4/2019 |
| EP | 1 383 225 A1 | 1/2004 |
| FR | 2837632 A1 | 9/2003 |
| TW | 483223 B | 4/2002 |
| TW | 508892 B | 11/2002 |
| TW | 200401491 A | 1/2004 |
| TW | I566504 B | 1/2017 |
| TW | I569117 B | 2/2017 |
| TW | I620399 B | 4/2018 |
| TW | I648473 B | 1/2019 |
| TW | 201931730 A | 8/2019 |
| WO | 2009/013043 A2 | 1/2009 |

OTHER PUBLICATIONS

Cogging Torque and Acoustic Noise Reduction in Permanent Magnet Motors by Teeth Pairing, Sang-Moon Hwang, Jae-Boo Eom, Geun-Bae Hwang, Weui-Bong Jeong, and Yoong-Ho Jung, IEEE Transactions on Magnetics, Sep. 2000, pp. 3144-3146.

Design of a Permanent Magnet Synchronous Motor with Grain Oriented Electrical Steel for Direct Drive Elevators, Stefano Cicale, Luciano Albini, Francesco Parasiliti, Marco Villani, IEEE Int. Conf. Elect Mar. 2012, pp. 1256-1263.

Design Techniques for Reducing the Cogging Torque in Surface Mounted PM Motors, Nicola Bianchi and Silverio Bolognani, IEEE Transactions on Industry Applications, Sep. 2002, pp. 1259-1265.

Manufacturing Methods of Stator Cores with Concentrated Windings F. Libert and J. Soulard, IET International Conference on Power Electronics, Machines and Drives, Apr. 2006, pp. 676-680.

A Permanent Magnet Flux Switching Motor For Low Energy Axial Fans, Yi Cheng, Charles Pollock and Helen Pollock, IEEE IAS Annu. Meeting, Oct. 2005, pp. 2168-2175.

Australian Office Action issued in corresponding application No. 2020202450, dated Mar. 28, 2021.

Singapore Search Report issued in corresponding application 10202003394W, dated Apr. 15, 2021.

Chinese Office Action dated Jun. 11, 2021 as received in application No. 201910879983.3.

* cited by examiner

MOTOR STATOR WITH DOVETAIL OR RECTANGULAR MOUNT STRUCTURE AND STATOR TEETH AIRGAP WIDTH RATIO

CROSS-REFERENCE TO RELATED APPLICATIONS

This non-provisional application claims priority under 35 U.S.C. § 119(a) on Patent Application No(s). 108128968 filed in Taiwan, R.O.C on Aug. 14, 2019, the entire contents of which are hereby incorporated by reference.

TECHNICAL FIELD

The disclosure relates to a moto stator, more particularly a combined motor stator.

BACKGROUND

A permanent-magnet motor has many advantages, such as simple structure, reliable operation, small size, low energy loss and high efficiency, and these advantages make it being widely used in a variety of fields, such as aerospace, national defense, industry, agriculture, manufacture, and livelihood. The conventional stator of the permanent-magnet motor is a single silicon steel lamination, but such configuration will result in large noise during operation.

SUMMARY OF THE INVENTION

One embodiment of the disclosure provides a combined motor stator which is configured to be cooperated with a rotor. The combined motor stator includes a stator yoke and a plurality of stator teeth. The stator yoke has a plurality of first mount structures. Each of the plurality of stator teeth has a second mount structure. The second mount structures of the stator teeth are respectively and removably mounted on the first mount structures of the stator yoke. Each of the second mount structures is in a dovetail shape.

Another embodiment of the disclosure provides a combined motor stator which is configured to be cooperated with a rotor. The combined motor stator includes a stator yoke and a plurality of stator teeth. The stator yoke has a plurality of first mount structures. Each of the plurality of stator teeth has a second mount structure. The second mount structures of the stator teeth are respectively and removably mounted on the first mount structures of the stator yoke. Each of the plurality of stator teeth is configured to be spaced apart from the rotor by an air gap. The air gap has a minimum gap width. Every two adjacent of the plurality of stator teeth and the stator yoke together form a stator slot therebetween, every two adjacent of the plurality of stator teeth form a slot opening therebetween and connected to the stator slot, and a ratio of an opening width of the slot opening to the minimum gap width of the air gap is not less than 0.6 and is not more than 6.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
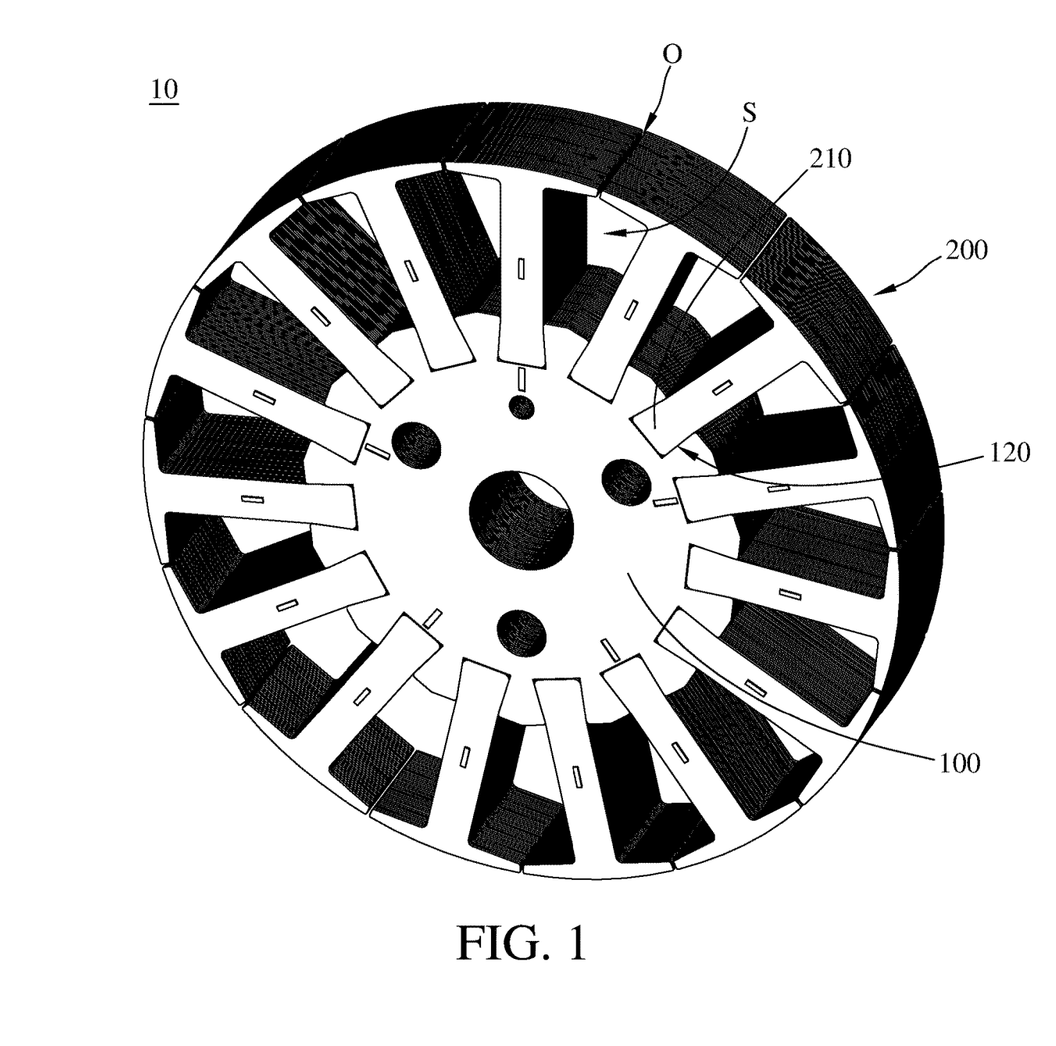
FIG. 1 is a perspective view of a combined motor stator according to a first embodiment of the disclosure.
Figure 2:
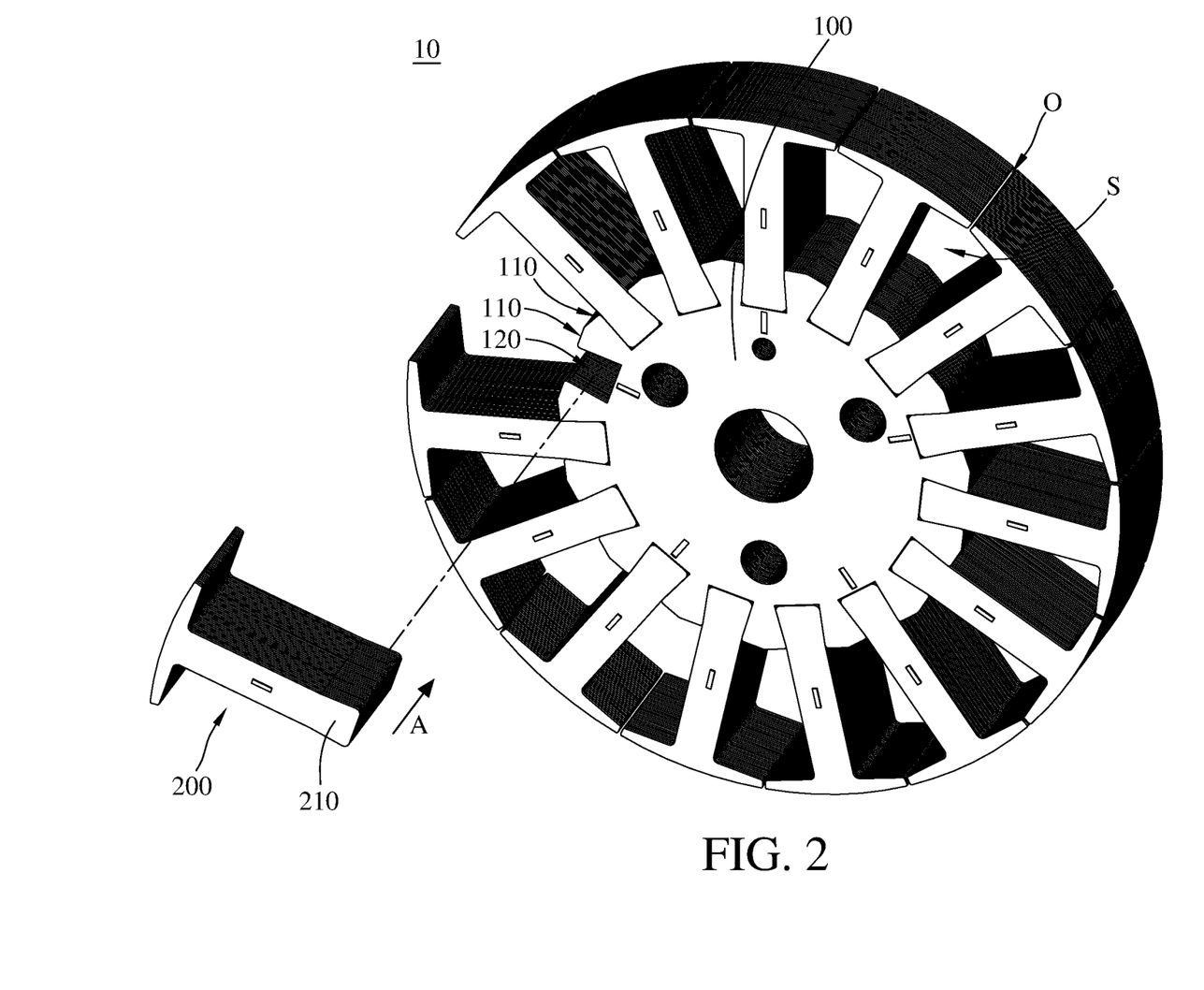
FIG. 2 is a partial exploded view of the combined motor stator in FIG. 1.
Figure 3:
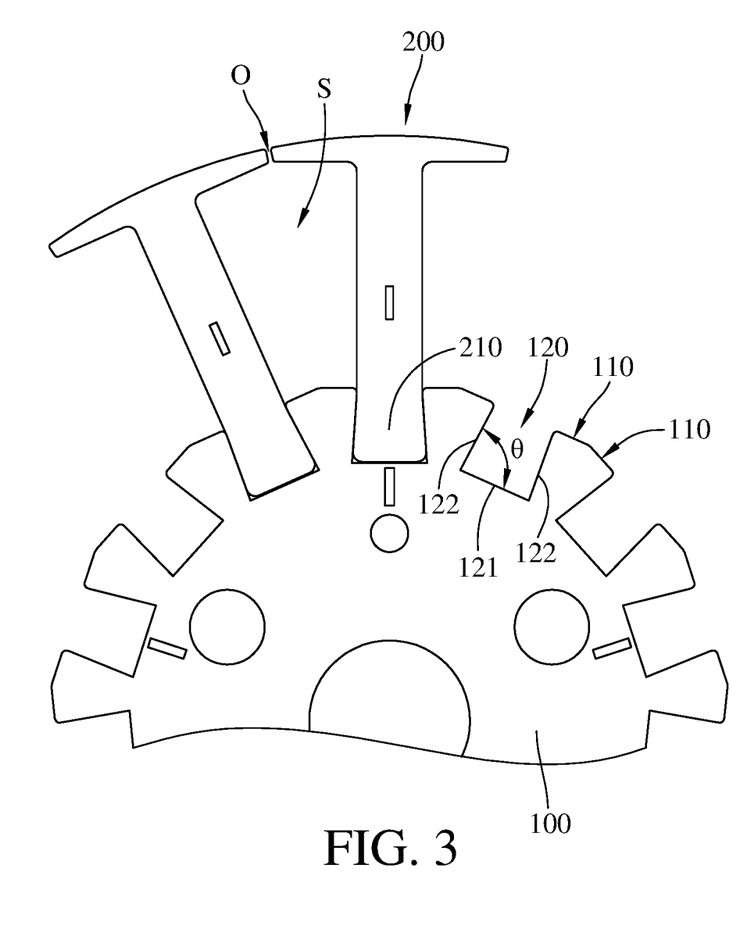
FIG. 3 is a partial planar view of a stator yoke and two stator teeth of the combined motor stator in FIG. 2.

Referring to FIGS. 1 to FIG. 3, FIG. 1 is a perspective view of a combined motor stator 10 according to a first embodiment of the disclosure, FIG. 2 is a partial exploded view of the combined motor stator 10 in FIG. 1, and FIG. 3 is a partial planar view of a stator yoke 100 and two of stator teeth 200 of the combined motor stator 10 in FIG. 2.

In this embodiment, the combined motor stator 10 is applicable to, for example, a motor of a fan, where the fan is, for example, a ceiling fan, but the disclosure is not limited thereto. The combined motor stator 10 includes the stator yoke 100 and the stator teeth 200. The stator yoke 100 and each of the stator teeth 200 are formed by thin silicon steel sheets being stacked on top of one another; that is, the stator yoke 100 and each of the stator teeth 200 are silicon steel laminations. The stator yoke 100 has a plurality of first mount structures, such as mount holes 120 shown in FIG. 2.

The stator yoke 100 has a plurality of outer surfaces 110 and a plurality of mount holes 120. The mount holes 120 are respectively formed on the outer surfaces 110. For the purpose of illustration, the following paragraphs merely describe one of the mount holes 120. Referring to FIG. 3, in each mount hole 120, the stator yoke 100 has a bottom surface 121 and two lateral surfaces 122 together form one mount hole 120. More specifically, the two opposite sides of the bottom surface 121 are respectively connected to the lateral surfaces 122. In this embodiment, as shown in FIG. 3, the mount hole 120 is, for example, a dovetail hole, and each of the lateral surface 122 has an acute angle θ to the bottom surface 121. Moreover, in this embodiment, the acute angle θ is, for example, not less than 60 degrees and not more than 89.5 degrees. In this or some other embodiment, there may be a round corner located between and connected to the bottom surface 121 and the lateral surface 122 of the stator yoke 100, and the radius of the round corner is not particularly restricted and can be modified according to actual requirement.

Each of the stator teeth 200 has a second mount structure, such as an insertion portion 210 in a shape mating the mount hole 120. The insertion portions 210 of the stator teeth 200 are respectively removably inserted into the mount holes 120 of the stator yoke 100; referring to FIG. 2, the insertion portion 210 of the stator tooth 200 is allowed to be inserted into or removed from one of the mount holes 120 of the stator yoke 100 along a direction A. By doing so, as shown in FIG. 2 or FIG. 3, the stator teeth 200 radially protrude from the outer surfaces 110 of the stator yoke 100. In more detail, referring to FIG. 3, every two adjacent of the stator teeth 200 and the stator yoke 100 together form a stator slot S therebetween, and every two adjacent of the stator teeth 200 form a slot opening O therebetween and connected to the stator slot S.

Since the dovetail-shaped insertion portions of the stator teeth 200 are respectively inserted into the dovetail-shaped mount holes 120, the stator teeth 200 are not allowed to move in a radial direction (e.g., a radial direction R shown in FIG. 4) of the stator yoke 100. In the combined motor stator 10, each of the stator teeth 200 and the stator yoke 100 are silicon steel laminations, and the mount holes 120 and insertion portions 210 are all in dovetail shape, such that a natural frequency of the combined motor stator 10 is approximately ranging from 936 Hz to 952 Hz. In contrast, to a conventional motor stator whose stator yoke and stator teeth are made of a single piece, it may have a natural frequency approximately ranging only from 31 Hz to 41 Hz; to another conventional motor stator whose stator yoke and stator teeth are formed of a single lamination, it may have a natural frequency approximately ranging only from 25 Hz to 33 Hz. As such, the combined motor stator 10 has a relative higher natural frequency.

Then, the following describes the advantages of the high natural frequency of the combined motor stator 10 when the combined motor stator 10 is applied to the ceiling fan. Generally, the vibration frequency of the ceiling fan caused by the cogging torque is smaller than 808 Hz, and the vibration frequency is proportional to rotational speed of the ceiling fan. When the ceiling fan rotates at 60 rpm, the vibration frequency of the ceiling fan is approximately 240 Hz; and when the ceiling fan rotates at 202 rpm, the vibration frequency of the ceiling fan is approximately 808 Hz. Therefore, it is understood that the natural frequency of any type of conventional motor stators fall within the range of the vibration frequency of the ceiling fan, and which must result in resonance and thus producing noise. In contrast, the natural frequency of the combined motor stator 10 is much higher than the vibration frequency of the ceiling fan, thus the ceiling fan having the combined motor stator 10 is able to prevent the resonance and thus reducing noise and increasing performance.

In addition, the stator teeth 200 are removably inserted into the stator yoke 100, thus the installation of winding to the stator teeth 200 can be performed before installing the stator teeth 200 to the stator yoke 100. Therefore, there is no need to have a large size of slot opening between the stator teeth 200 for the installation of stator winding. That is, the slot opening O between the stator teeth 200 can be optimized to be in a small size.

In this embodiment, the first mount structure and the second mount structure are respectively the mount hole 120 and the insertion portion 210, but the present disclosure is not limited thereto; in some other embodiments, the first mount structure may be an insertion portion, and the second mount structure may be a mount hole.

Figure 4:
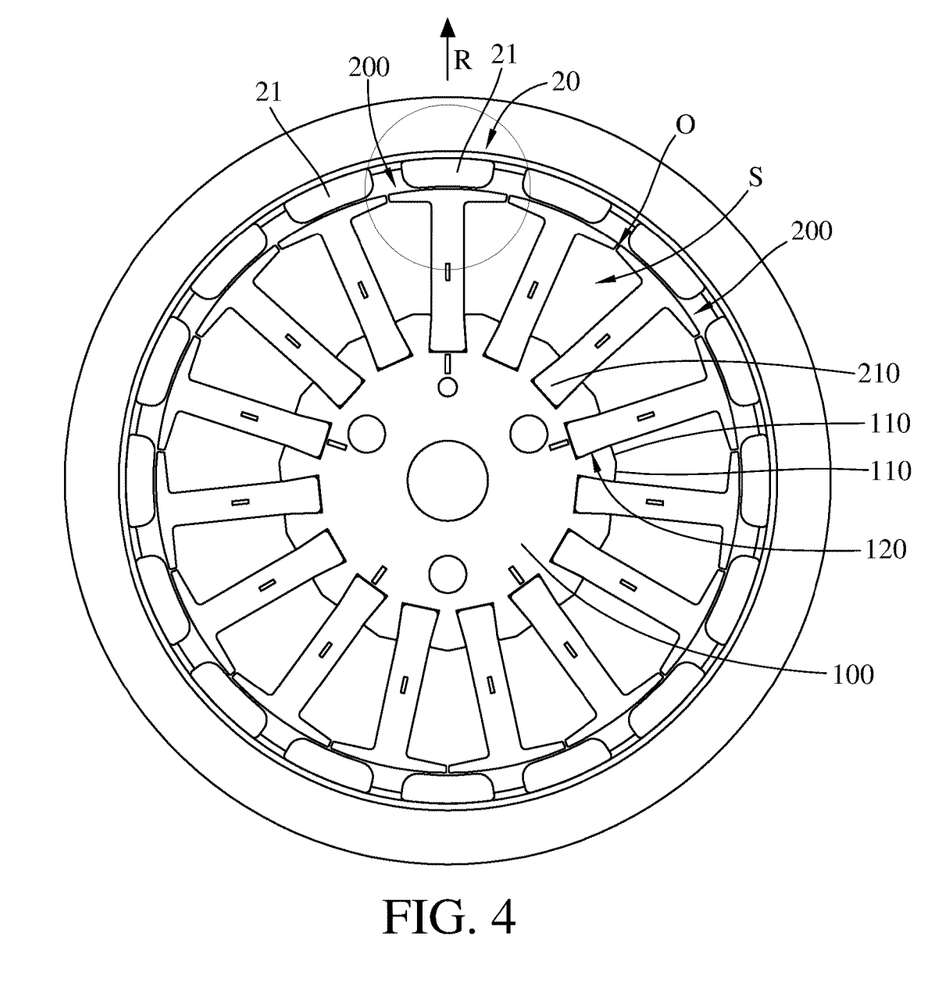
FIG. 4 is a planar view of a rotor and the combined motor stator in FIG. 1.
Figure 5:
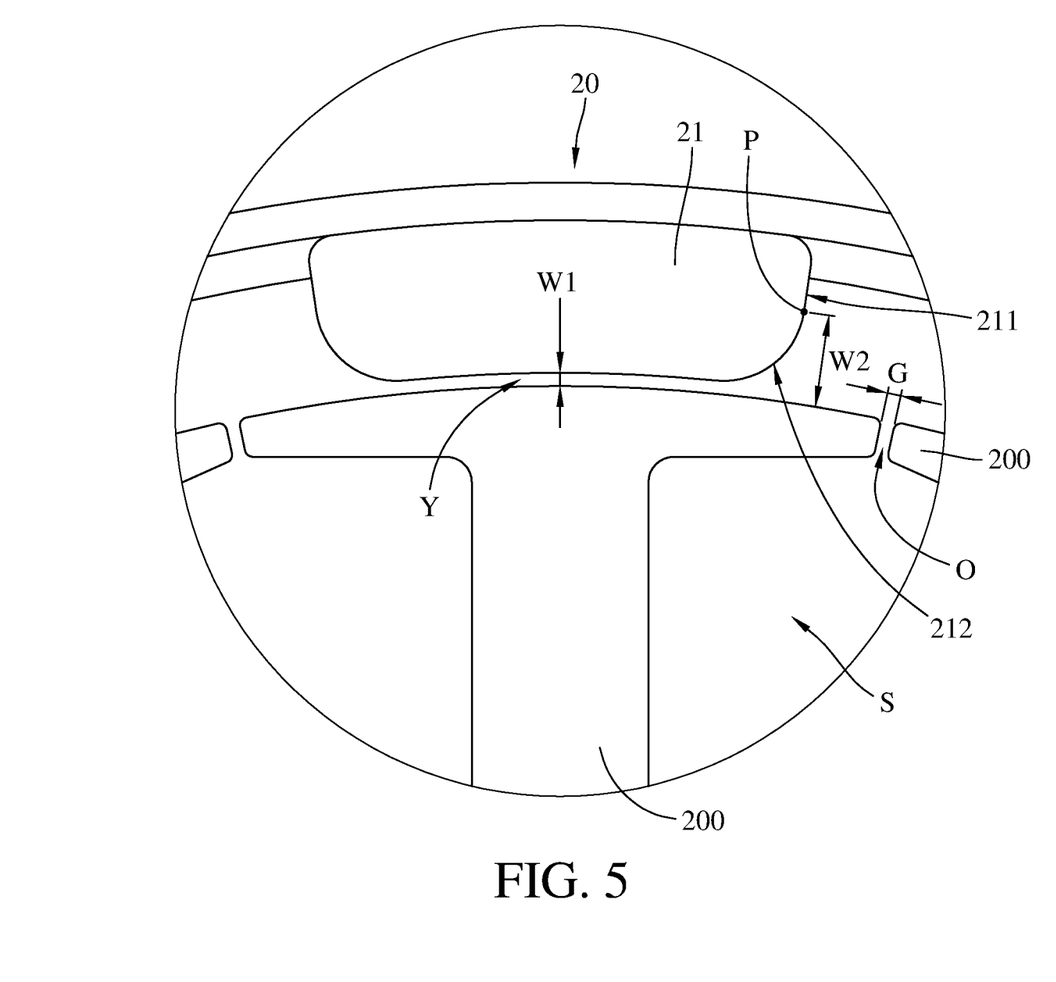
FIG. 5 is a partial enlarged planar view of the rotor and the combined motor stator in FIG. 4.

Referring FIGS. 4 and 5, FIG. 4 is a planar view of a rotor 20 and the combined motor stator 10 in FIG. 1, and FIG. 5 is a partial enlarged planar view of the rotor and the combined motor stator in FIG. 4.

FIGS. 4 and 5 show that the combined motor stator 10 is installed in the rotor 20 having magnets 21, in such a case, each of the stator teeth 200 of the combined motor stator 10 is spaced apart from the rotor 20 by an air gap Y. Define that the minimum gap width of the air gap Y is W1 and the maximum gap width of the air gap Y is W2, where the minimum gap width W1 of the air gap Y exists at the central portion of the air gap Y, and the maximum gap width W2 of the air gap Y exists at a lateral edge of the magnet 21 of the rotor 20 and one of the openings of the air gap Y. More specifically, the maximum gap width W2 of the air gap Y is a distance between a point P where a lateral surface 211 of the magnet 21 is connected to a curved surface 212 of the magnet 21 and the stator teeth 200. In addition, in this embodiment, a ratio of an opening width G of the slot opening O to the minimum gap width W1 of the air gap Y is not less than 0.6 and is not more than 6. For example, the opening width G of the slot opening O is approximately 1.8 millimeters, and the minimum gap width W1 of the air gap Y approximately ranges between 0.3 millimeters and 3 millimeters.

According to a simulation result, if the ratio of the opening width G of the slot opening O to the minimum gap width W1 is not less than 0.6 and is not more than 6, the motor having the combined motor stator 10 can produce a large average torque ranging between 1.29 and 1.31 N-m, a counter electromotive force ranging between 67 and 69 voltages and a radial force ranging between 1 and 7 N. In another case, if the aforementioned ratio is less than 0.6, the counter electromotive force would reduce to be smaller than 30 voltages. In still another case, if the aforementioned ratio is more than 6, the radial force produced by the motor would increase to be larger than 23 N. Therefore, it is understood that the motor having the combined motor stator 10 has a better performance.

In addition, a ratio of the maximum gap width W2 of the air gap Y to the minimum gap width W1 of the air gap Y also affects the motor performance. According to a simulation result, when such ratio is not less than 5 and is not more than 11, the motor having the combined motor stator 10 has a better performance.

Figure 6:
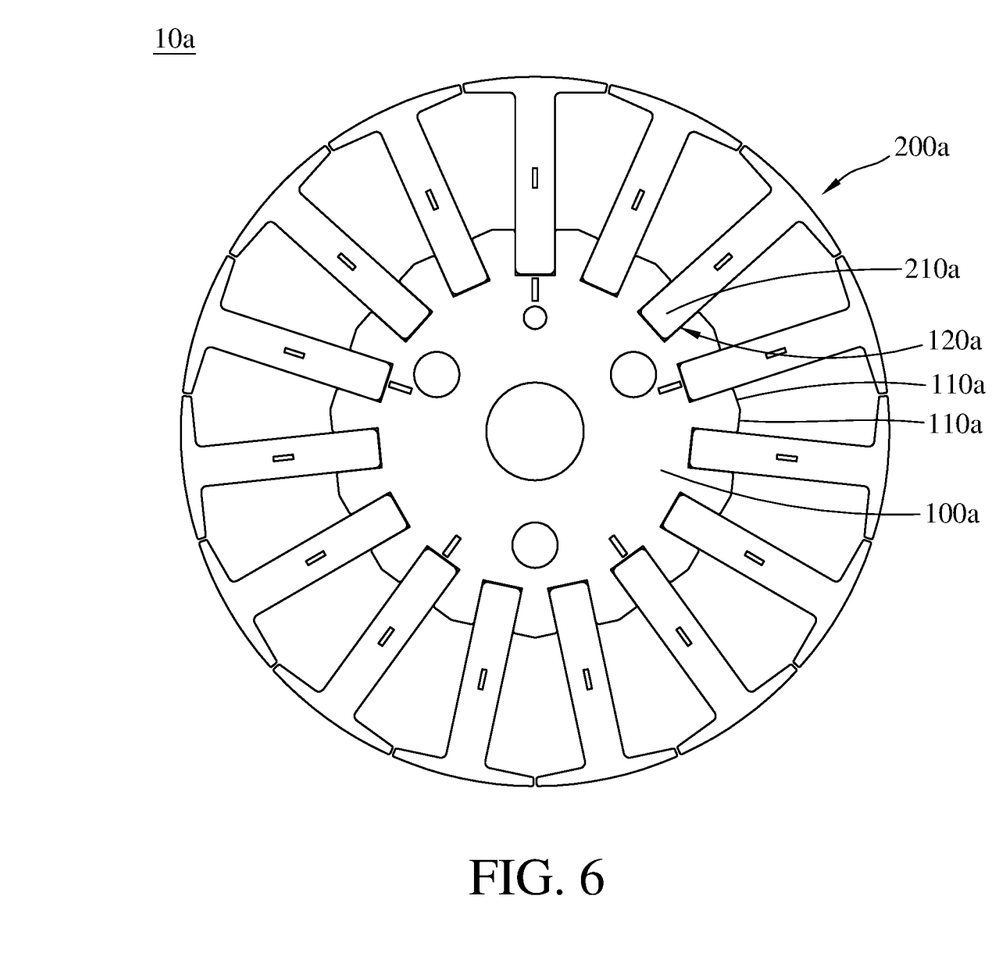
FIG. 6 is a planar view of a combined motor stator according to a second embodiment of the disclosure.

Referring to FIG. 6, where FIG. 6 is a planar view of a combined motor stator 10a according to a second embodiment of the disclosure.

In this embodiment, the combined motor stator 10a is applicable to, for example, a motor of a fan, where the fan is, for example, a ceiling fan, but the present disclosure is not limited thereto. The combined motor stator 10a includes a stator yoke 100a and a plurality of stator teeth 200a. The stator yoke 100a and each of the stator teeth 200a are all, for example, formed by thin silicon steel sheets being stacked on top of one another; that is, the stator yoke 100a and each of the stator teeth 200a are silicon steel laminations. The stator yoke 100a has a plurality of first mount structures, such as mount holes 120a shown in FIG. 6, and each of the mount holes 120a is formed by a bottom surface and two lateral surfaces of the yoke 100a. The mount holes 120a of the stator yoke 100a are in rectangular shapes. In this or some other embodiment, there may be a round corner located between and connected to the bottom surface and the lateral surface of the stator yoke 100a, and the radius of the round corner is not particularly restricted and can be modified according to actual requirement. Each of the stator teeth 200a has an insertion portion 210a. The insertion portions 210a of the stator teeth 200a have shapes mating the mount holes 120a of the stator yoke 100a. The insertion portions 210a of the stator teeth 200a are respectively and removably inserted into the mount holes 120a of the stator yoke 100a.

In this embodiment, the insertion portions 210a of the stator teeth 200a are respectively inserted into the mount holes 120a, the mount holes 120a and insertion portions 210a are all in rectangular shape, and each of the stator teeth 200a and the stator yoke 100a are silicon steel laminations, such that a natural frequency of the combined motor stator 10a is approximately ranging from 437 Hz to 519 Hz. In contrast, to a conventional motor stator whose stator yoke and stator teeth are made of a single piece, it may have a natural frequency approximately ranging only from 31 Hz to 41 Hz; to another conventional motor stator whose stator yoke and stator teeth are formed of a single lamination, it may have a natural frequency approximately ranging only from 25 Hz to 33 Hz. As such, the combined motor stator 10a has a relative higher natural frequency.

Although the combined motor stator 10a has the natural frequency being smaller than that of the combined motor stator 10, the natural frequency of the combined motor stator 10a is stilled much higher than that of the conventional motor stator, such that the resonance problem of the ceiling fan can be still improved to a certain level and thus also reducing the noise of the ceiling fan and enhancing the performance of the ceiling fan.

According to the combined motor stators as discussed above, the stator teeth of the combined motor stator are respectively inserted into the dovetails-shaped or rectangular mount holes of the stator yoke via the dovetails-shaped or rectangular insertion portions of the stator teeth, such that the combined motor stator can have higher natural frequency to improve the resonance problem of the motor and enhance the performance of the motor. Especially, the mount structures are respectively the dovetail-shaped mount holes and the dovetail-shaped insertion portions mating each other, the movement of the stator teeth along the radial direction of the stator yoke is limited, such that the natural frequency of the combined motor stator is further increased, thereby further improving the resonance problem and the performance of the motor.

Moreover, when the ratio of the width of the slot opening and the minimum gap width is not less than 0.6 and is not more than 6, the motor having the combined motor stator can produce a large average torque, a larger counter electromotive force and a smaller radial force, which makes the motor having the combined motor stator 10 have a better performance.

Furthermore, when the ratio of the maximum gap width of the air gap to the minimum gap width of the air gap is not less than 5 and is not more than 11, the motor having the combined motor stator has a better performance.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A combined motor stator, configured to be cooperated with a rotor, comprising:
   a stator yoke, having a plurality of first mount structures; and
   a plurality of stator teeth, wherein each of the plurality of stator teeth has a second mount structure, the second mount structures of the plurality of stator teeth are respectively and removably mounted on the plurality of first mount structures of the stator yoke;
   wherein each of the second mount structures is in a dovetail shape;
   wherein each of the plurality of stator teeth is configured to be spaced apart from the rotor by an air gap, the air gap has a minimum gap width, every two adjacent of the plurality of the stator teeth and the stator yoke together form a stator slot therebetween, every two adjacent of the plurality of the stator teeth form a slot opening therebetween and connected to the stator slot, a ratio of an opening width of the slot opening to the minimum gap width of the air gap is not less than 0.6, and is not more than 6;
   wherein the air gap further has a maximum gap width, a ratio of the maximum gap width of the air gap to the minimum gap width of the air gap is not less than 5 and is not more than 11.

2. The combined motor stator according to claim 1, wherein the plurality of first mount structures and the second mount structures are respectively insertion portions and mount holes mating the insertion portions.

3. The combined motor stator according to claim 1, wherein the stator yoke and each of the plurality of stator teeth are formed by silicon steel sheets being stacked on top of one another.

4. The combined motor stator according to claim 1, wherein the plurality of first mount structures and the second mount structures are respectively mount holes and insertion portions mating the mount holes.

5. The combined motor stator according to claim 4, wherein the stator yoke has a bottom surface and two lateral surfaces, two opposite sides of the bottom surface are respectively connected to the two lateral surfaces, one of the mount holes is formed by the bottom surface and the two lateral surfaces, and each of the lateral surfaces has an angle to the bottom surface, and the angle is not less than 60 degrees and is not more than 89.5 degrees.

6. A combined motor stator, configured to be cooperated with a rotor, comprising:
   a stator yoke, having a plurality of first mount structures; and
   a plurality of stator teeth, wherein each of the plurality of stator teeth has a second mount structure, the second mount structures of the plurality of stator teeth are respectively and removably mounted on the plurality of first mount structures of the stator yoke, and each of the plurality of stator teeth is configured to be spaced apart from the rotor by an air gap;
   wherein the air gap has a minimum gap width, every two adjacent of the plurality of stator teeth and the stator yoke together form a stator slot therebetween, every two adjacent of the plurality of stator teeth form a slot opening therebetween and connected to the stator slot, and a ratio of an opening width of the slot opening to the minimum gap width of the air gap is not less than 0.6 and is not more than 6;
   wherein each of the second mount structures is in a rectangular shape;
   wherein the air gap further has a maximum gap width, a ratio of the maximum gap width of the air gap to the minimum gap width of the air gap is not less than 5 and is not more than 11.

7. The combined motor stator according to claim 6, wherein the plurality of first mount structures and the second mount structures are respectively mount holes and insertion portions mating the mount holes.

8. The combined motor stator according to claim 6, wherein the plurality of first mount structures and the second mount structures are respectively insertion portions and mount holes mating to the insertion portions.

9. The combined motor stator according to claim 6, wherein the stator yoke and each of the plurality of stator teeth are formed by silicon steel sheets being stacked on top of one another.

* * * * *